(12) United States Patent
Ording (10) Patent No.: US 8,972,890 B2
(45) Date of Patent: Mar. 3, 2015

(54) AMINATED MENU BAR

(75) Inventor: Bas Ording, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 1111 days.

(21) Appl. No.: 10/090,627

(22) Filed: Mar. 6, 2002

(65) Prior Publication Data

US 2003/0169298 A1  Sep. 11, 2003

(51) Int. Cl.
*G06F 3/048* (2013.01)
*G06F 3/0482* (2013.01)
*G06F 3/0481* (2013.01)

(52) U.S. Cl.
CPC ............ *G06F 3/0482* (2013.01); *G06F 3/0481* (2013.01)
USPC ............................ 715/802; 715/817; 715/821

(58) Field of Classification Search
USPC ................. 345/716, 805, 119, 810, 825, 473;
715/716, 805, 119, 810, 825, 473, 161,
715/726, 778, 779, 818, 830, 861, 708, 802,
715/817, 821
See application file for complete search history.

(56) References Cited

U.S. PATENT DOCUMENTS

| 5,359,712 | A | * | 10/1994 | Cohen et al. | 715/723 |
| 5,659,694 | A | * | 8/1997 | Bibayan | 715/788 |
| 5,706,458 | A | * | 1/1998 | Koppolu | 715/841 |
| 5,724,492 | A | * | 3/1998 | Matthews et al. | 345/419 |
| 5,745,710 | A | * | 4/1998 | Clanton, III et al. | 345/716 |
| 5,883,626 | A | * | 3/1999 | Glaser et al. | 715/788 |
| 5,999,173 | A | * | 12/1999 | Ubillos | 715/723 |
| 6,297,819 | B1 | * | 10/2001 | Furst | 715/733 |
| 6,628,310 | B1 | * | 9/2003 | Hiura et al. | 715/776 |
| 6,636,246 | B1 | * | 10/2003 | Gallo et al. | 345/805 |
| 6,909,443 | B1 | * | 6/2005 | Robertson et al. | 715/782 |
| 6,957,395 | B1 | * | 10/2005 | Jobs et al. | 715/765 |

OTHER PUBLICATIONS

Mac OS X 10.1, CNET Archive, Apple Inc., Sep. 29, 2001.

* cited by examiner

*Primary Examiner* — Thanh Vu
(74) *Attorney, Agent, or Firm* — Schwegman Lundberg & Woessner, P.A.

(57) ABSTRACT

The present invention provides a transition between two or more menu bars. The transition provided is both useful and aesthetic in that is enhances the aesthetic transition between the menu bars and serves to notify a user of such a transition. The transition is animated with one of a number of different animation techniques, such as rotation, scrolling, shading, virtual lighting, and the like. Three-dimensional graphics mapping may be provided to enhance the animation of the menu bar.

28 Claims, 7 Drawing Sheets

AMINATED MENU BAR

FIELD OF THE INVENTION

The present invention is directed to graphical user interfaces for computer systems, and more particularly, the present invention relates to the transformation of menu bars within a graphical user interface of a computer system.

BACKGROUND OF THE INVENTION

A prominent aspect of many personal computer systems is the graphical user interface (GUI). It is primarily the GUI that the user employs to interact with the computer. Typically, the GUI consists of a desktop, windows, icons, and various types of menus. These menus allow a user to select functionality provided by the computer's software programs. These menus may be presented in a variety of fashions. For example, pull-down menus may be presented to a user in a menu bar.

A menu bar is a portion of the computer display of the GUI, e.g. at the top of the screen, within which several menu options are presented to a user. When the menu is activated, usually by "pointing and clicking" with a mouse, a pull-down menu appears below a menu item in the menu bar.

The choices presented to a user within the menu bar vary according to programs being used. For example, multiple applications may be running on a computer, each of which may present different menu options within a menu bar at the top of the screen. Thus, a user is presented with menu commands related to the operating system (OS) when interacting with the OS, and with a menu relating to a word processing program when operating a word processing program. The menu bar selections change as different applications are selected by the user, or are brought to the foreground.

A difficulty may occur in recognizing the different menu bars for each of a variety of applications that may be running on a computer or that a change between menu bars has taken place. For example, if a user selects the window of an application to bring it to the foreground, the user may not recognize that he has been presented with a new group of menu choices within the menu bar associated with that application. This could be problematic if the user selects a function to be executed from a pull-down menu thinking that another application is the active application.

Accordingly, it would be desirable to provide a GUI that aids a user in recognizing that new choices within the menu bar have been presented to him. It would also be desirable to provide this notification in an aesthetically pleasing manner, while continuing to provide all of the functionality associated with traditional GUIs.

SUMMARY OF THE INVENTION

In accordance with the present invention, the foregoing objectives are achieved by a menu bar that undergoes an animated transition (e.g., an apparent rotation) each time the menu bar options are changed.

The animated menu bar of the present invention provides a convenient, aesthetically pleasing transition between menu bar choices associated with different applications. Additionally, by way of the animated menu bar of the present invention, a user is presented with visual notification that the menu bar options have changed.

In accordance with an embodiment of the present invention, each time a new application is brought to the foreground, or becomes active, within the operating system, an animated effect is presented to the user to indicate this change. The animation may, for example, present the appearance that the menu bar is rotating from an old group of menu bar choices associated with a recently deactivated program, or a program that has been moved to the background within the operating system GUI, and the choices associated with a newly activated program, or a program that has been moved to the foreground of the GUI.

These and other features of the invention are explained in greater detail hereinafter with reference to an exemplary embodiment of the invention illustrated in the accompanying drawings.

DETAILED DESCRIPTION

To facilitate an understanding of the principles of the present invention, it is described hereinafter with reference to its application in a specific embodiment. Specifically, the present invention will be described in connection with its implementation within the Macintosh Operating System (Mac OS) available from Apple Computer, Inc. of Cupertino, Calif. It will be appreciated, however, that the implementation of the invention that is described hereinafter is merely exemplary, and that the invention can find practical application in any environment which presents various menu choices associated with applications, and the options contained therein are changed in response to an event, e.g., as different applications are brought to the foreground, or activated by a user. Thus, for example, the principles which underlie the present invention can be employed in any operating system which makes use of changing menu choices or menu bars.

Prior to discussing the specific features of an exemplary embodiment of the invention, a general overview is presented of a computer system within which the present invention may be implemented. Such a system is illustrated in block diagram form in FIG. 1. The structure of the computer system illustrated in FIG. 1 is presented to provide background regarding the manner in which the features of a GUI implementing the invention cooperate with the structure of the computer.

Figure 1:
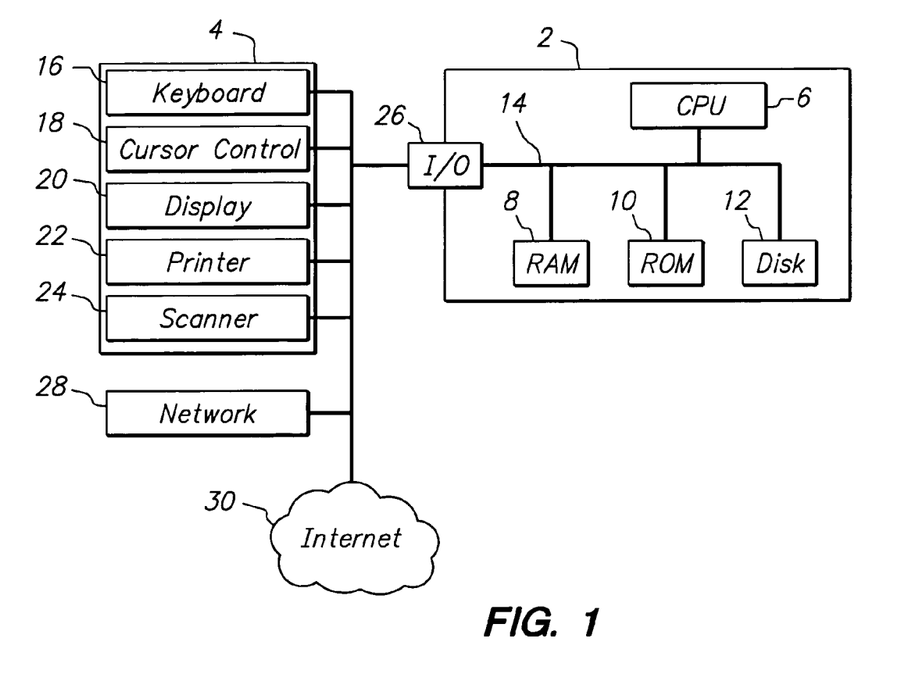
FIG. 1 is a block diagram of a computer system within which the present invention can be implemented.

Referring to FIG. 1, the system includes a computer 2 having a variety of external peripheral devices 4 connected thereto. The computer 2 includes a Central Processing Unit (CPU) 6, a main memory which is typically implemented in the form of Random Access Memory (RAM) 8, a static memory that can comprise a Read Only Memory (ROM) 10, and a storage device, such as a magnetic or optical disk 12. The CPU 6 communicates with each of these forms of memory via an internal bus 14. The peripheral devices 4 include a data entry device such as a keyboard 16, and a pointing or cursor control device 18 such as a mouse, trackball, or the like. A display device 20, such as a CRT monitor or an LCD screen, provides a visual display of the information that is processed within the computer, for example the contents of a computer file. A hard copy of the information displayed on the display device 20 can be provided through a printer 22, or similar device. In addition, a scanner 24 may be provided to allow the input and conversion of a paper document into computer processing memory. Each of these external peripheral devices communicates with the CPU 6 by way of one or more input/output ports 26 on the computer. The input/output ports 26 also allow the computer 2 to interact with a local area network server or an external network 28 such as a LAN or WAN, or the Internet 30.

The computer 2 typically includes an operating system, which controls the allocation and usage of the hardware resources such as memory, central processing unit time, disk space, and peripheral devices. In addition to an operating system, the computer 100 may also include various other software programs designed to be executed by the CPU 6.

Figure 2A:
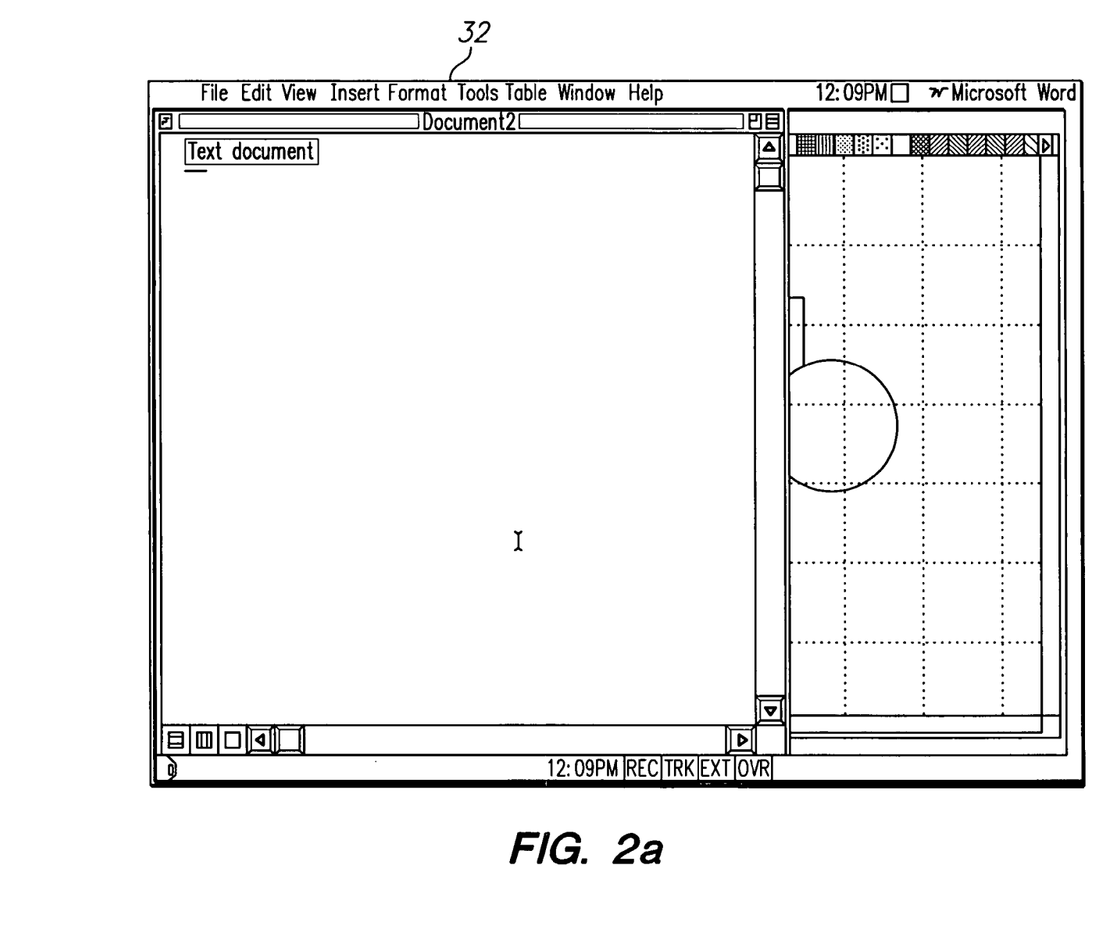
FIGS. 2a-2b are diagrams of menu bars in a GUI associated with an embodiment of the present invention.
Figure 2B:
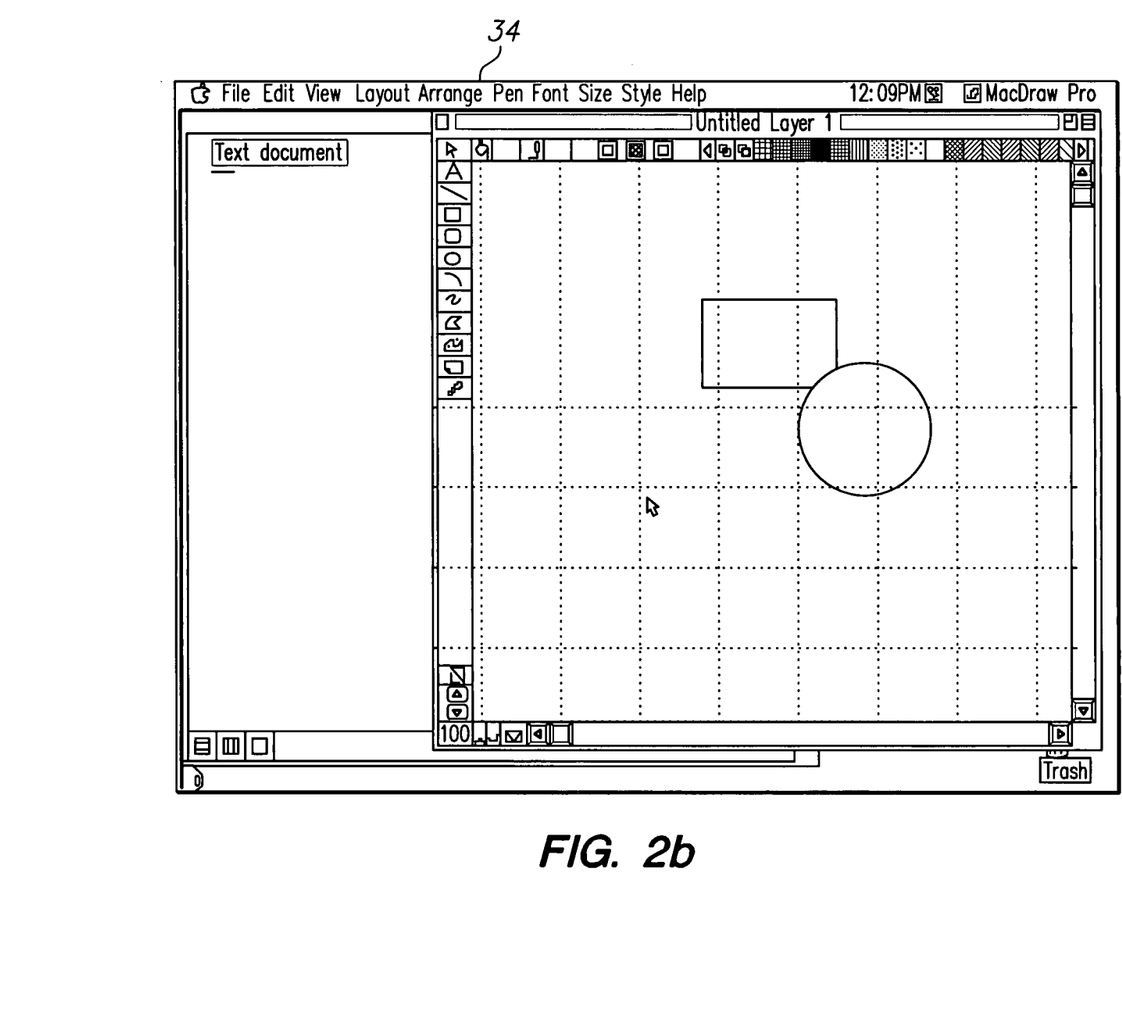

As different applications running on the computer are activated and deactivated by a user, or brought to the foreground and pushed to the background, the menu options in a menu bar change to display commands associated with that application. Referring now to FIGS. 2a-2b, two menu bars 32, 34 are illustrated, which are associated with different applications. In FIG. 2a, a first menu bar 32 is illustrated having a variety of menu options associated with the word processing application that is currently active (i.e., the application controlling the text document in the foreground). When the document associated with the drawing application is brought to the foreground by selecting the window associated therewith (e.g., by a user-initiated event, such as a mouse click event, or the like), the first menu bar 32 is changed to a second menu bar 34, which has different menu choices. For example, although the second menu bar 34 shares the same first few pull-down menu options, the majority of menu options in the second menu bar 34 are different from those presented in the first menu bar 32. These pull-down menus of each program contain functionality that relate to their respective programs (i.e., the word processing application and the drawing application, respectively).

In practice, the display of the appropriate menu on the menu bar is handled by a menu manager, which comprises a portion of the computer's operating system. The menu manager receives information from each program executing on the computer as to the contents of the menu items associated with that application. When the user switches from one application to another, or to the operating system desktop, the menu manager retrieves the appropriate menu items for the active application and instructs a display manager to display them at the appropriate locations for the menu bar.

As mentioned above, in the transition between menu bars, the first few menu commands (and the last menu command) remain the same, while the rest of the menu commands change. This is common, as many functions provided within various applications are similar or the same. Hence, the names of the first few menu commands may remain the same, even if the functions provided therein differ, thereby allowing the user to become accustomed to certain options always being present. Additionally, as the second menu bar 34 has more options than those presented in the first menu bar 32, there are more categories of functions associated with the application for which the second menu bar 34 is presented (i.e., the drawing application).

Even though the number of menu options presented in the second menu bar 34 is greater than the number of options presented in the first menu bar 32, because the total area occupied by all of the menu commands is essentially the same, and because the first few menu options and the last menu options of the first and second menu bars 32, 34, appear identical, at times it may be difficult for a user to immediately recognize that the menu bar has been changed. Thus, if the windows of each of the word processing and drawing applications were sized such that both of the full windows from each of the applications could be viewed simultaneously, a user may accidentally change which application is current (i.e., which application is in the foreground of the computer's OS GUI) without recognizing that such a change has been made. However, if the change between the first and second menu bars 32, 34 were animated in such a manner that the user would immediately recognize that a change in the menu bar has taken place, and that consequently a different application has been brought to the foreground, such difficulties would be avoided.

The present invention provides an animation during menu bar transitions, such as the transition illustrated between FIGS. 2a-2b, to provide a user with better notice of such changes, and to provide an atheistically pleasing transition. Such animations may occur, for example, in response to an application being brought to the foreground, or by a user opening or otherwise activating an application, or by an application being pushed to the background, or by a user quitting or otherwise deactivating an application. These animated transitions may comprise a variety of different animations. For example, the menu bar may be animated in such a fashion that it appears to rotate, turning from the first menu bar 32 to the second menu bar 34. Other animations may be used to provide a similar aesthetically pleasing effect, while providing additional notice to a user. Some such examples may include, but are not limited to: shading effects, scrolling animation, various 3-D animation effects, and the like.

The effect of rotation can be carried out in a number of different ways. For instance, first and second menu bars can be made to appear as if they are located on opposite sides of a planar strip, and the strip rotates 180° about its longitudinal axis when transitioning from a menu bar associated with one application to another. FIGS. 3a-3g illustrate an embodiment of the present invention for achieving such an effect. In operation, the menu manager creates a virtual three-dimensional menu bar strip, and projects it onto the two-dimensional area of the menu bar on the computer desktop. FIGS. 3a-3g depict a conceptual end view of the menu bar strip 35 and the display area 36 on the desktop. To facilitate an understanding of the concepts, the side of the menu bar strip containing the first menu 32 is illustrated in white, and the side of the strip containing the second menu 34 is depicted in black.

Figure 3A:
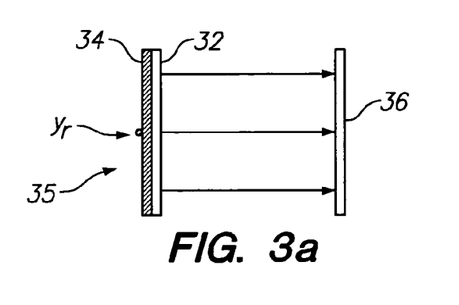
FIGS. 3a-3g illustrate the transformation steps in accordance with an embodiment of the present invention.
Figure 3B:
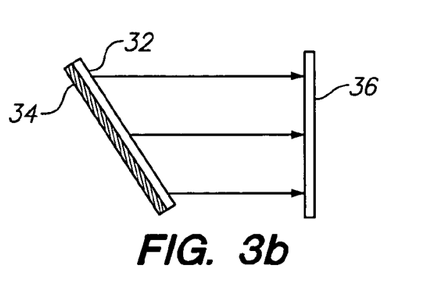
Figure 3C:
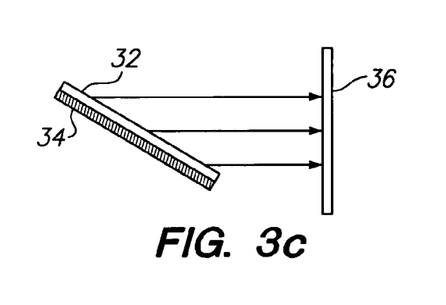

FIG. 3a illustrates the situation in which the first application is active. Hence, the first menu 32 is projected onto the entirety of the display area 36, in a conventional manner. When the second application is made active, the menu manager calculates the displacement of the pixels that constitute the menu display in the display area 36 over a period of time during which the rotational effect is to take place. In this embodiment, the menu rotates about a horizontal axis, so the displacement of the pixels in the display area 36 occurs in a vertical, or y-axis direction, and the pixel positions remain constant in the horizontal, or x-axis direction, as measured from a user's perspective viewing the desktop.

During the transition, the strip 35 rotates through an angle of 180° in the counter-clockwise direction (with relationship to the end view shown in FIGS. 3a-3g) during a time period $T=t_f-t_o$, where $t_o$ and $t_f$ are the start and finish times, respectively, for the transition. In the case of constant rotational speed, for example, the magnitude of the instantaneous rotational position $\theta_i$ at any given instant $t_i$ is given as $$\theta_i = \frac{t_i - t_o}{T} \cdot 180°.$$

Each pixel in the menu bar has an absolute position (x,y) in the display area 36, and a reference position (x,y') which indicates its displacement from the rotational axis of the strip 35. If the location of the rotational axis is designated $y_r$, then $y'=y-y_r$. In the illustrated embodiment, $y_r$ is located in the middle of the strip, so that the pixels in the top half of the menu bar have a positive value for y', and those in the bottom half have a negative value.

At time $t_o$, when the transition is to begin, the menu manager calculates a new position for each pixel in the menu bar 32 at each instant of time i. To do so, a new instantaneous reference position $y'_i = y'_o \cos \theta_i$ is calculated, where $y_t$ is the reference position at time i and $y'_o$ is the initial reference position at time $t_o$. This reference position is transformed into an absolute position by calculating $y_i = y'_t + y_r$. These two calculations can be simplified as $y_i = y_r + y'_o \sin \theta_t$. The pixel is projected onto the display area 36 at position $(x,y_i)$.

Figure 3D:
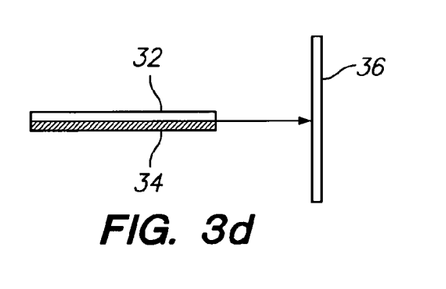
Figure 3E:
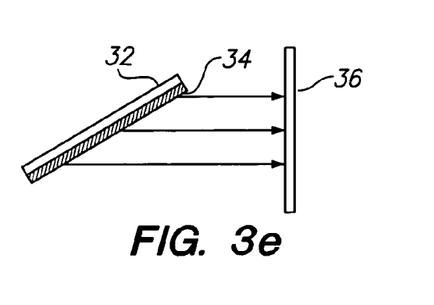
Figure 3F:
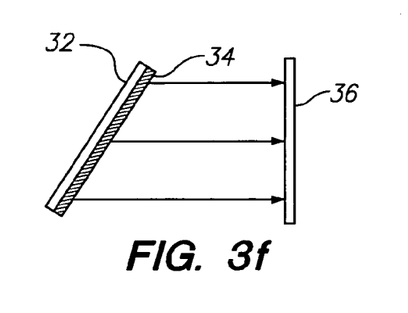
Figure 3G:
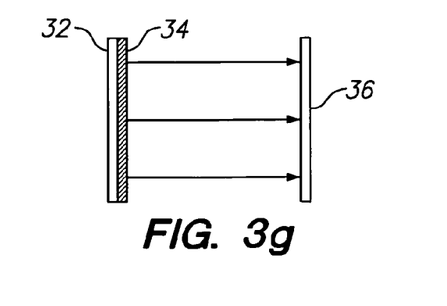

Thus, through the first 90° of counter-clockwise rotation (shown sequentially in FIGS. 3a-3d), the pixels in the first menu merge towards the rotational axis $y_r$, until they are all aligned along the axis, as depicted in FIG. 3d. In other words, the menu appears as a single row of pixels. At this point, the menu manager switches to the second menu 34. Then, as rotation continues, the pixels of the second menu move away from the rotational axis $y_r$, as depicted in FIGS. 3e and 3f, until rotation is complete at time T, and the menu 34 is shown in its normal, full-view position depicted in FIG. 3g.

In FIGS. 3a-3g, the images of the menu bars 32, 34 appear to rotate about an axis $y_r$ in the center of the strip 35. However, this need not be the case. For example, FIGS. 4a-4g illustrate an alternative in which the rotation appears to be more of a hinged movement than a rotation about an axis. In this case, $y_r$ is located at the top of the strip 35.

Referring to FIGS. 4a-4g, multiple steps are illustrated in which the menu bar transition is rendered as if it were a hinged rotation. The effect illustrated in FIG. 4 presents the illusion that two menu bars 42, 44 are rotated as if hinged from $y_r$ at the top of the menu bar display 46 on the computer screen. In this embodiment, the points are mapped to the display space 46 in a similar manner to those points mapped in FIGS. 3a-3g, however, the highest point of the menu bars 42, 44, is always illustrated at the top of the space 46.

Therefore, the animation effect depicted in FIGS. 4a-4g presents the user with the illusion that the first menu bar 42 is swung upright until it reaches the top of the menu bar display bar display space 46 (shown sequentially in FIGS. 4a-4d), and then the second menu bar 44 is swung down from the top of the menu bar display space 46 (shown sequentially in FIGS. 4e-4g)).

The effects illustrated in FIGS. 3a-3g and 4a-4g may be enhanced by way of representing changes in lighting on the menu bars. The illusion of the change in lighting may be achieved by way of known 3-D algorithms that vary the shading of the menu bars according to the position of an imaginary light source. For example, in FIGS. 3a-3g and 4a-4g, if an imaginary light source is positioned at an angle beneath the menu bars, as the apparent rotation occurs, the first menu bar 32, 42, grows increasingly darker using gray scaling as the rotation proceeds in steps 3a-3c and 4a-4c.

Figure 4A:
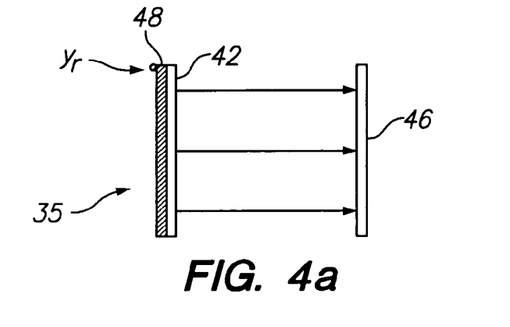
FIGS. 4a-4g illustrate the transformation steps in accordance with an embodiment of the present invention.
Figure 4B:
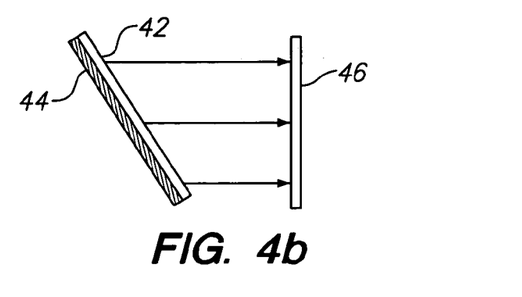
Figure 4C:
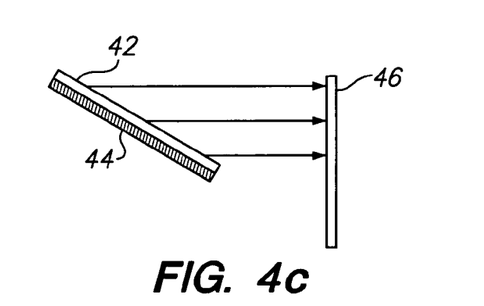
Figure 4D:
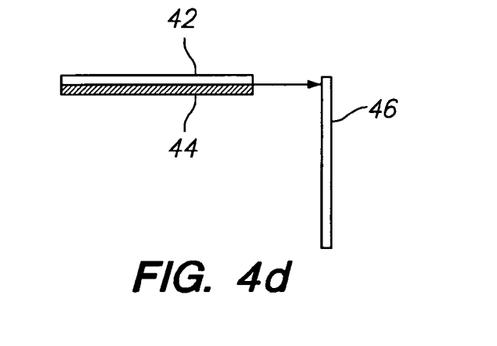
Figure 4E:
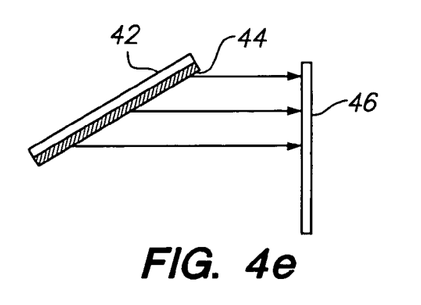
Figure 4F:
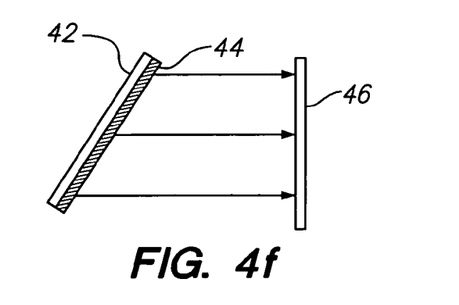
Figure 4G:
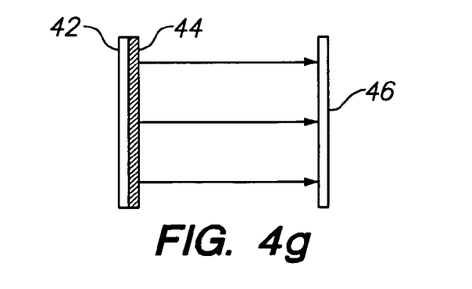

Finally, the menu bar is invisible, or appears as a black line of single pixel width in FIGS. 3d, 4d. The second menu bar 34, 44, grows increasingly brighter as the rotation proceeds through FIGS. 3e-3g and 4e-4g.

Figure 5:
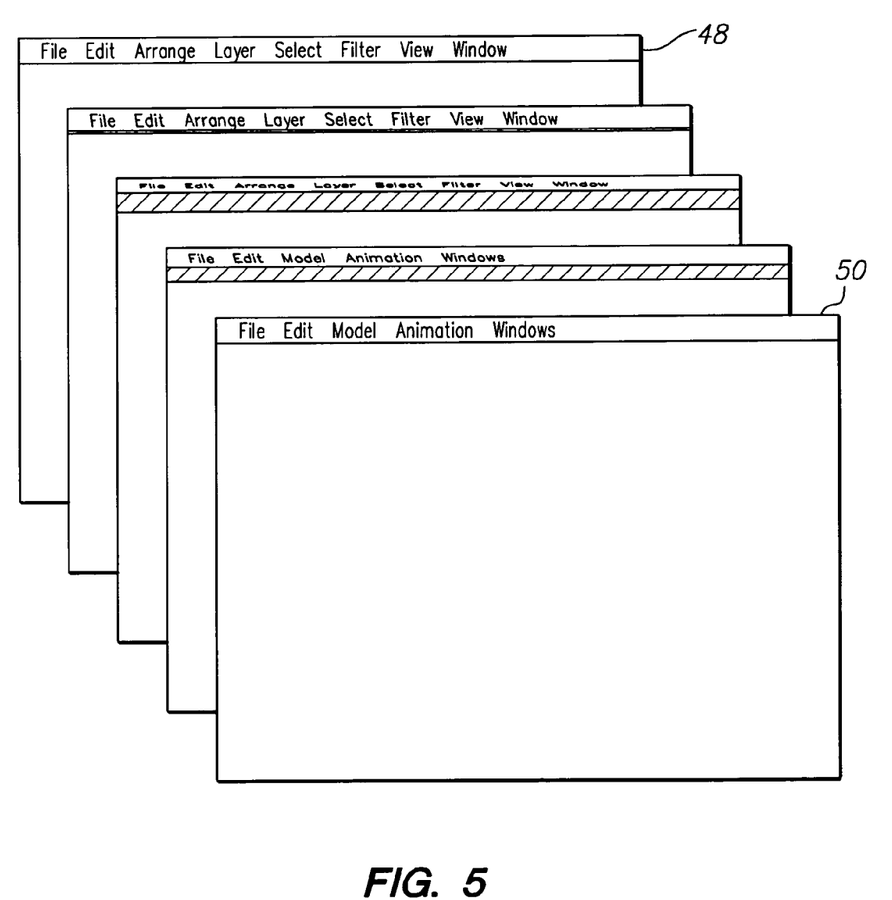
FIG. 5 is a diagram illustrating the transformation steps in accordance with an embodiment of the present invention.

Different virtual lighting configurations may be represented by way of various gray scale manipulation techniques. One example of the rotating menu bar illustrated in FIGS. 4a-4g using a particular lighting effect is illustrated in FIG. 5. The menu bar rotated in FIG. 5 utilizes an apparent hinged rotation technique similar to the one shown in FIGS. 4a-4g.

In FIG. 5, a first menu bar 48 is illustrated as rotating upward until it disappears. Then, a second menu bar 50 becomes visible, and is rotated downward until it fills the menu bar display space in its final position. The virtual lighting changes illustrated in the menu bar display space during the transition from the first menu bar 48 to the second menu bar 50 are achieved by simulating shadows using gray scaling techniques. In FIG. 5, as the first menu bar is apparently rotated upward, away from the imaginary light source located at an angle below the menu bar, it becomes gradually darker until it finally disappears. The second menu bar 50 then appears brightly lit, as if from the same virtual light source located at an angle below the menu bar.

Figure 6A:
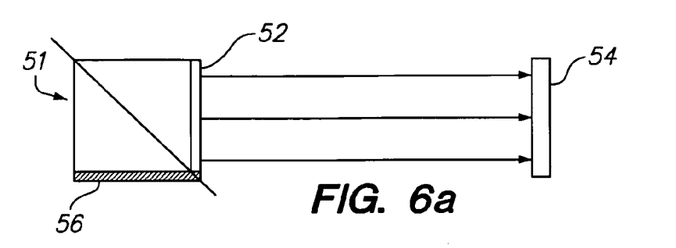
FIGS. 6a-6c illustrate the transformation steps in accordance with an embodiment of the present invention.
Figure 6B:
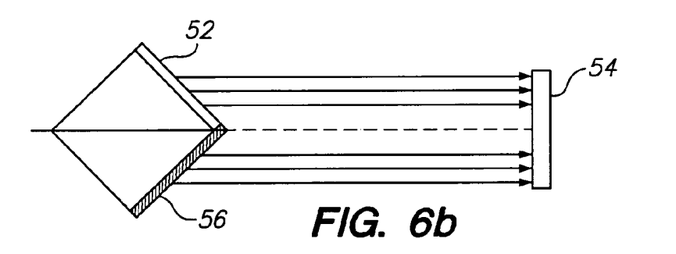
Figure 6C:
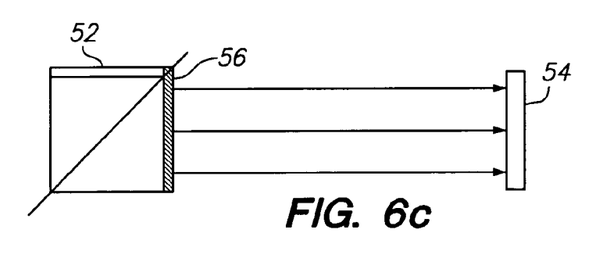

In the examples of FIGS. 3a-3g and 4a-4g, the first menu bar rotates completely out of view before the second menu bar begins to come into view. In FIGS. 6a-6c, an alternative rotational effect is illustrated. In this embodiment, the second menu bar comes into view as the first menu bar is still disappearing. This effect can be achieved by positioning the two menus on adjacent sides of a virtual square 51, rather than opposite sides of a strip. Referring to FIG. 6a, a first menu bar 52 is mapped to a menu bar display space 54. As the first menu bar 52 begins to rotate upward, the pixels, within this menu bar are mapped to locations within the menu bar display space 54 using a sine function, as in the examples of FIGS. 3a-3g and 4a-4g. At the same time, a second menu bar 56 is mapped to the menu bar space 54, using the cosine function. In FIG. 6b, therefore, portions of two menu bars are mapped to the menu bar display space 54 simultaneously. This apparent rotation continues, until in FIG. 6c, the second menu bar 56 is fully displayed within the menu bar display space 54.

As can be seen by those skilled in the art, multiple rotation techniques could be used to achieve varying effects. A variety of three dimensional mapping techniques may be used to map the apparently rotating menu bars into the menu bar space on the computer screen. For example, the height of each menu bar illustrated in FIGS. 3a-3g, 4a-4g, and 6a-6c, is calculated using a sinusoidal function. Transformation functions other than sinusoidal functions may also be used to map the transitioning menu bars into the menu bar display space on the computer's OS GUI on the computer screen. As previously indicated, multiple lighting effects may be achieved by way of varying gray scale pattern usage. Additionally, colors may be used to accent or emphasize the animation effect in a manner similar to the use of gray scale patterns.

As discussed above, a menu bar may be changed using a variety of animation techniques, and need not be limited to rotation. For example, a scrolling marque-style transition may be used, wherein a first menu bar is slowly scrolled off the screen, seeming to leave the second menu bar behind, which appears to have been below the first menu bar. Animations may be determined, for example, by pre-set user preferences. Additionally, varying animations may be presented in connection with corresponding desktop themes. Thus, an animation technique appropriate to a current desktop motif may be used for aesthetic considerations.

Figure 7:
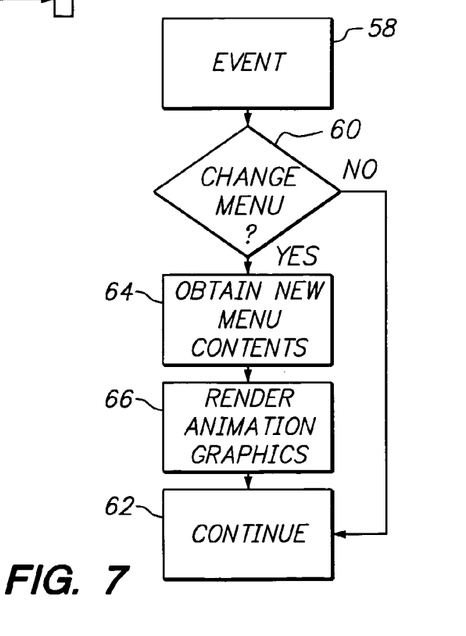
FIG. 7 is a flow diagram illustrating the steps executed in accordance with an embodiment of the present invention.

In FIG. 7, a flow diagram sets forth the steps carried out in the menu manager that are associated with the menu bar animation of the present invention. As an event 58 occurs, such as a user switching between applications, quitting an application, opening an application or the like, the determination 60 is made as to whether or not the menu bar needs to change. It will be recognized by those skilled in the art that the determination made at step 60 may be made in response to detecting that the event 58 has occurred, and may comprise a wide variety of determination techniques. For example, a determination technique may be as simple as some computer instruction code being executed, or may involve more complex determinations of a variety of parameters. If it is decided that a menu bar change is not required for the event, then the OS may display the same menu bar, and continue on to further processing 62, to handle any appropriate action associated with the event 58. If, on the other hand, it is determined that a change in the menu bar is required for the event, then the new menu contents are obtained at 64, and the animation graphics are rendered at step 66.

The foregoing description has been provided in the context of menu bars within a computer OS GUI. It will be appreciated that such a menu bar and other series of pull-down or other menu choices can be similarly implemented in multiple computer operating systems. Hence, the present invention finds utility in any computer OS, in which the menu bar or other series of pull-down menus changes during the transition between applications, or at the occurrence of some other pre-determined event.

From the foregoing, therefore, it can be seen that the present invention provides a variety of animated techniques for changing menu bars according to pre-defined computer events requiring such a change. In addition to these features, the menu bar that is provided through this system achieves an aesthetically pleasing transition between two or more different menu bars, and a notification to a user of the change in menu bars and corresponding menu command choices.

It will be appreciated by those of ordinary skill in the art that the present invention can be embodied in other forms without departing from the spirit or essential characteristics thereof. For instance, while an exemplary embodiment of the invention has been described in the context of a rotating menu bar in the Mac OS, it will be appreciated that the principles underlying the invention can be applied in any environment or computer OS where animation of menu bars or other menu choices for notification of changing menu bars and for aesthetic purposes is desired. Additionally, as will be appreciated by those of ordinary skill in the art, the animation of menu bars or menu choices need not be limited to situations in which menu bars or choices are changed at an OS level in response to activation or deactivation of applications. Rather, the animation techniques of the present invention may be presented at an application level as well, wherein animation of a change in menu choices could be effected within a single application, or at any other level in which such animation would be desirable. The foregoing description is therefore considered to be illustrative, and not restrictive. The scope of the invention is indicated by the following claims, and all changes that come within the meaning and range of equivalents are therefore intended to be embraced therein.

What is claimed is:

1. A computerized method, comprising:
   displaying a first menu bar in a graphical user interface on a display, the position of the first menu bar being determined independent of the position of any window in the graphical user interface, the first menu bar displaying a set of first menus associated with a first window in the graphical user interface;
   detecting a change in focus from the first window to a second window in the graphical user interface; and
   responsive to detecting the change in focus, animating a change in the first menu bar from displaying the set of first menus associated with the first window to displaying a set of second menus associated with the second window, the first and second menus including at least one different menu, the animation of the first menu bar being independent of any animations applied to the first and second window as a result of the change in focus.

2. The method of claim 1, wherein detecting a change in focus comprises detecting the user clicking on the second window.

3. The method of claim 1, wherein detecting a change in focus comprises detecting the opening of a second application to make the second application active, the detecting occurring at a time when the first window was active and the second window was not yet open.

4. The method of claim 1, wherein detecting a change in focus comprises detecting, at a time when the first window is active and the second window is open, a user action to close the first window to make the second window active.

5. The method of claim 1, wherein the animating comprises a rotation animation which produces a visual effect of the first set of menu options and the second set of menu options being located on opposite sides of a planar strip that is rotating 180 degrees about its longitudinal axis to transition from the first set of menu options to the second set of menu options.

6. The method of claim 1, wherein the animating comprises a scrolling animation which produces a visual effect of the first set of menu options scrolling off the first menu bar and becoming invisible as the second set of menu options scrolls onto the first menu bar and becomes visible.

7. The method of claim 1, wherein the animating comprises displaying three-dimensional animation graphics.

8. The method of claim 7, wherein displaying the three-dimensional animation graphics comprise animation graphics utilizing gray scales.

9. The method of claim 8, wherein displaying the three-dimensional animation graphics utilize gray scales to achieve a virtual lighting effect.

10. A computerized method comprising:
    displaying a first menu bar in a graphical user interface on a display, the position of the first menu bar being determined independent of the position of any window in the graphical user interface, the first menu bar displaying a set of first menus associated with a first window in the graphical user interface;
    detecting a change in focus from the first window to a second window in the graphical user interface; and
    responsive to detecting the change in focus, performing steps for animating a change in the first menu bar from displaying the set of first menus associated with the first window to displaying a set of second menus associated with the second window using an animation, the first and second menus including at least one different menu, the animation of the first menu bar being independent of any animations applied to the first and second window as a result of the change in focus.

11. A non-transitory machine readable medium that stores instructions which when performed by a machine, cause the machine to perform operations comprising:
    displaying a first menu bar in a graphical user interface on a display, the position of the first menu bar being determined independent of the position of any window in the graphical user interface, the first menu bar displaying a set of first menus associated with a first window in the graphical user interface;

detecting a change in focus from the first window to a second window in the graphical user interface; and responsive to detecting the change in focus, animating a change in the first menu bar from displaying the set of first menus associated with the first window to displaying a set of second menus associated with the second window using an animation, the first and second menus including at least one different menu, the animation of the first menu bar being independent of any animations applied to the first and second window as a result of the change in focus.

12. A system comprising:

a computer processor configured to:

display in a graphical user interface, a first menu bar positioned independent of the position of any window generated for display in the graphical user interface, the first menu bar displaying a set of first menus associated with a first window in the graphical user interface;

detect a change in focus from the first window to a second window in the graphical user interface; and responsive to detecting the change in focus, generate an animation to change the first menu bar from displaying the set of first menus associated with the first window to displaying a set of second menus associated with the second window, the first and second menus including at least one different menu, the animation of the first menu bar being independent of any animations applied to the first and second window as a result of the change in focus.

13. The system of claim 12, wherein the processor is configured to detect a change in focus by detecting the user clicking on the second window.

14. The system of claim 12, wherein the processor is configured to detect a change in focus by detecting the opening of a second application to make the second application active, the detecting occurring at a time when the first window was active and the second window was not yet open.

15. The system of claim 12, wherein the processor is configured to detect a change in focus by detecting at a time when the first window is active and the second window is open, the first window is closed to make the second window active.

16. The system of claim 12, wherein the processor is configured to generate an animation by at least generating a rotation animation, the rotation animation producing a visual effect of the first set of menu options and the second set of menu options being located on opposite sides of a planar strip that is rotating 180 degrees about its longitudinal axis to transition from the first set of menu options to the second set of menu options.

17. The system of claim 12, wherein the processor is configured to generate an animation by at least generating a scrolling animation, the scrolling animation producing a visual effect of the first set of menu options being scrolled off the first menu bar and becoming invisible as the second set of menu options is scrolled onto the first menu bar and becomes visible.

18. The system of claim 12, wherein the processor is configured to generate an animation by at least generating three-dimensional animation graphics.

19. The system of claim 18, wherein the three-dimensional animation graphics comprise animation graphics utilizing gray scales.

20. The system of claim 19, wherein the three-dimensional animation graphics utilize gray scales to achieve a virtual lighting effect.

21. A computerized method, comprising:

generating information associated with a first application, for display in a first graphical user interface element of a graphical user interface, the first graphical user interface element positioned independently of any window in the graphical user interface, the first graphical user interface element displaying information associated with the first application;

detecting a change in an activation state of the first application;

responsive to detecting the change in activation state of the first application, changing the first graphical user interface element from displaying the information associated with the first application to displaying information associated with a second application using an animation, the information associated with the first application being different from the information associated with the second application, the animation of the first graphical user interface element being independent of any animations applied to graphical representations of the first and second applications as a result of the change in activation state.

22. The method of claim 21 wherein:

the first graphical user interface element is a menu bar; and detecting the change in activation state of the first application comprises detecting a loss of focus.

23. The method of claim 22, wherein detecting the change in activation comprises receiving an indication that the user has clicked on a window belonging to the second application.

24. The method of claim 21, wherein the animation comprises a rotation animation which produces a visual effect of the information associated with the first application and the information associated with the second application being located on opposite sides of a planar strip that is rotating 180 degrees about its longitudinal axis to transition from the information associated with the first application to the information associated with the second application.

25. The method of claim 21, wherein the animation comprises a scrolling animation which produces a visual effect of the information associated with the first application scrolling off the first graphical user interface element and becoming invisible as the second set of menu options scrolls onto the first graphical user interface element and becomes visible.

26. The method of claim 21, wherein the animation comprises three-dimensional animation graphics.

27. The method of claim 26, wherein the animation graphics comprise animation graphics utilizing gray scales.

28. The method of claim 27, wherein the three-dimensional animation graphics utilize gray scales to achieve a virtual lighting effect.

* * * * *

UNITED STATES PATENT AND TRADEMARK OFFICE
CERTIFICATE OF CORRECTION

PATENT NO. : 8,972,890 B2  
APPLICATION NO. : 10/090627  
DATED : March 3, 2015  
INVENTOR(S) : Bas Ording Page 1 of 1

It is certified that error appears in the above-identified patent and that said Letters Patent is hereby corrected as shown below:

On the title page item (54), and in the specification, in column 1, line 1, in "Title", delete "AMINATED" and insert --ANIMATED--, therefor Signed and Sealed this  
Twenty-eighth Day of July, 2015

Michelle K. Lee  
*Director of the United States Patent and Trademark Office*